Patented Sept. 29, 1942

2,297,227

UNITED STATES PATENT OFFICE 2,297,227

MANUFACTURE OF INDUSTRIAL GASES

Karl Koller and Zsigmond Gálocsy, Budapest, Hungary; vested in the Alien Property Custodian No Drawing. Application March 21, 1939, Serial No. 263,204. In Hungary December 4, 1936

4 Claims. (Cl. 48—203)

This invention relates to the manufacture of producer gas or water gas or similar kinds of industrial gases. It is an object of our invention to influence and regulate the composition of gases of this kind. The invention comprises a method of conducting the production of such industrial gases in gas producer plants in such a manner that the gases produced have the composition desired for the particular purpose in view. Other objects of the invention will appear as the specification proceeds.

In the manufacture of producer gas and similar kinds of gases it is often desirable to influence or change the composition of the gas which is withdrawn as a rule from the upper part of the gas producer. For instance with certain kinds of coal, which yield slags of low melting point, gasification can only be carried out with a large excess of steam. The producer gas thus obtained has a very high content of hydrogen and carbon dioxide, which is objectionable for many purposes, more particularly if the gas shall be used for the heating of open hearth (Martin) furnaces, since the large content of carbon dioxide considerably reduces the burning velocity of the gas, while a high percentage of hydrogen is known to exert an obnoxious effect on the furnace. In such cases it is therefore desirable to reduce the hydrogen and carbon dioxide content of the producer gas. In other cases, more particularly where water gas shall be produced, for instance in the manufacture of gases for the carrying through of synthetical or hydrogenation processes, it is desirable to increase the hydrogen content, in other cases the methane content of the producer gas.

These examples already show that the composition of the producer gas should be controlled or influenced in different cases according to altogether different viewpoints. Hitherto no method was known whereby this control could be carried out in a simple manner and at low cost in the gas producer itself and in correspondence with the demands of the different purposes.

We have now succeeded in developing such a method by introducing additional gases, produced outside of the gas producer and having temperatures and compositions in accordance with the demands in view, into a zone of the gas producer which follows the gasifying zone and as a rule is situated higher than the gasifying zone. According to the invention some suitable kind of fuel is wholly or partly burnt with air or oxygen or with air enriched in oxygen in a separate combustion chamber which is in direct communication with the producer proper, according to the principles explained more in detail in our Patent Nos. 1,964,207 and 2,219,046. If the addition of steam is desired for the regulation of the composition of the producer gas, the necessary quantity of steam is introduced into said separate combustion chamber also. The combustion gases thus obtained are introduced directly, i. e. without any substantial cooling, into the column of solid fuel in the gas producer at a stage which follows the gasifying stage and the temperature of which is lower than the temperature in that stage, so that by the action of these gases the carbon dioxide, hydrogen, carbon monoxide and methane content of the gas produced in the gasifying stage is increased or decreased in dependency on the requirements of each individual case.

The gases which are thus introduced according to the invention, do not serve for gasifying the solid fuel in the gas producer, i. e. they are no gasifying agents, but are controlling or regulating means designed to produce, in the gas producer itself, from the primary producer gas, mainly by way of reactions occurring in the gas phase, a secondary gas of the desired composition.

The final composition of the producer gas can be varied within wide limits by controlling the relative quantities of the fuel, of the combustion agent and of the steam, if steam is used, which are introduced into the combustion chamber connected with the producer proper, in dependency on the fuel employed, on the temperature desired for the gas mixture and on the purpose of the control. It is for instance possible to employ in the combustion chamber an excess of fuel or of air or of oxygen or of steam.

Flue gas mixtures can also be introduced into several zones of the gas producer and in such a case we prefer to connect a separate combustion chamber to each zone of the producer into which gases are introduced.

Any kind of solid, liquid or gaseous fuel may be employed in the production of the flue gases in the combustion chamber or chambers connected with the gas producer proper. Coal dust, saw dust, oil or tar may for instance be used. It is however particularly advantageous to use the gases which are produced in the gas producer, as fuel in the combustion chamber. In the case, however, where the hydrogen content of the producer gas shall be increased, the best results can as a rule be obtained with low grade fuels, for instance with raw peat, since the high moisture and hydrogen content of these fuels influences the composition of the gas mixture in the desired direction.

The invention shall be explained more in detail with reference to the following example which concerns the gasification of a coal which yields low melting slags or the production of Mond gas. The producer gas prepared in that case may have the following composition:

| | Percent |
|---|---|
| $CO_2$ | 15.0 |
| $CO$ | 18.0 |
| $H_2$ | 21.0 |
| $CH_4$ | 3.0 |
| $N_2$ | 43.0 |
| | 100.0 |

It is known that a gas with so high a content of hydrogen is formed if steam in excess is introduced into the gas producer together with the air which serves for the gasification. This steam reacts in the upper (cooler) parts of the producer with the carbon monoxide already formed according to the known equation $$CO + H_2O = CO_2 + H_2$$

The composition of the gas mentioned above shall be influenced, according to this example, in such manner that the proportion of $H_2$ and $CO_2$ is reduced. The problem in this case is to prevent or to suppress the conversion $$CO + H_2O = CO_2 + H_2$$

Additional heat must be supplied for this purpose to that zone of the gas producer in which this conversion reaction would proceed, whereby not only this reaction is repressed, but also the reduction of the excessive quantity of steam is promoted. Simple thermochemical calculations show which amounts of heat energy must be supplied to the respective zone of the producer in order to obtain a final gas of the desired composition.

The heat may be supplied according to the invention by passing part of the gas produced in the producer into the combustion chamber closely connected with the producer, and partly burning it therein with a quantity of air, the oxygen content of which suffices only for the combustion of the hydrogen. The combustion can be conducted in this way, since hydrogen has a greater combustion velocity than the other constituents of the producer gas. The flue gas thus obtained has approximately the following composition:

| | Percent |
|---|---|
| $CO_2$ | 11 |
| $CO$ | 13 |
| $H_2O$ | 15 |
| $CH_4$ | 2 |
| $N_2$ | 59 |
| | 100 |

This flue gas, which thus contains besides $CO_2$, $H_2O$ and $N_2$ non-burnt $CO$ and $CH_4$ and the temperature of which is about 1000° C., is introduced into a zone of the gas producer in which prevails a temperature above 800° C. and below 1000° C. The $CO$ and $CH_4$ contained in the gas will pass through the gas producer unchanged. The conversion of the upwardly flowing $CO$ is prevented, since in consequence of the addition thereto the steam contained in the gas producer is widened in upward direction. In addition thereto the steam contained in the gas and the excess of steam which flows upwardly from below, react with the carbon of the fuel charge in the producer, whereby further quantities of $CO$ and $H_2$ are formed. By the introduction of a quantity of flue gas formed and calculated in the manner described above, the above-mentioned original composition of the producer gas can thus be changed in such manner that the gas which leaves the producer, has the following composition:

| | Percent |
|---|---|
| $CO_2$ | 7.0 |
| $CO$ | 26.0 |
| $H_2$ | 18.0 |
| $CH_4$ | 2.8 |
| $N_2$ | 46.2 |
| | 100.0 |

Still more favorable results are obtained, if the combustion takes place with oxygen instead of air.

If the composition of a water gas produced in an ordinary water gas producer or in an oxygen gas producer, i. e. in a water gas producer in which the fuel is gasified with the aid of oxygen, shall be so influenced that the percentage of hydrogen in the water gas is increased, the problem is inverse, since the conversion reaction, i. e. the reaction between carbon monoxide and steam, must be promoted. In this case it is preferable to completely burn in the separate combustion chamber a primary fuel, for instance part of the producer gas recycled, with oxygen or with air enriched in oxygen and to introduce into the combustion chamber, by saturating the combustion agent, a quantity of steam such that the temperature of the gas attains a value at which the conversion can proceed in the gas producer. This temperature is in any case below 800° C. The gas formed which consists almost exclusively of carbon dioxide, steam and perhaps some nitrogen, is then introduced into a zone of the gas producer wherein a temperature prevails which favors the conversion reaction mentioned. i. e. a temperature below 800° C.

If a producer gas originally has the composition I mentioned in the following Table 1, it can be influenced according to the invention in such a manner that it will have the final composition described in Table 1 as II:

*Table 1*

| | I | II |
|---|---|---|
| | Percent | Percent |
| $CO_2$ | 1.0 | 22.6 |
| $CO$ | 58.0 | 23.4 |
| $H_2$ | 32.0 | 47.0 |
| $CH_4$ | 5.0 | 3.9 |
| $C_nH_m$ | 0.8 | 0.6 |
| $N_2$ | 3.2 | 2.5 |
| | 100.0 | 100.0 |

Since in the final composition II the gas contains hydrogen and carbon monoxide in the proportion of $H_2:CO = 2:1$, it is particularly suitable for the benzine synthesis after the complete or a partial removal of the $CO_2$.

In some cases, for instance if oxygen gas producers of large capacity are used, such as disclosed for instance in our Patent 1,964,207, it may happen that the reaction velocity of the carbon monoxide conversion is not sufficient in comparison with the quantities of gas flowing upwardly. In such cases it is expedient to add to the fuel, with which the gas producer is charged, oxides of metals of the iron group, such as iron ores, iron scale or the like, which by their catalytical activity promote the formation of hydrogen at the cost of carbon monoxide. The metal oxides, such as iron oxide, which are thus added to the fuel, are reduced to metal in the lower zones of the gas producer owing to the high temperature and the reducing atmosphere prevailing in that zone, whereby the costs of the operation can be reduced.

Nickel chips or nickel salts or cobalt salts or carriers, amongst them coal and coke impregnated with these salts, may be mentioned by way of example as catalysts which can also be used for the purpose described. By selecting a suitable catalyst, for instance nickel chips, and, if desired, by correspondingly controlling the pressure in the gas producer, we can also obtain an increase of the methane content of the producer gas. A gas of the composition I mentioned in the above table can for instance be influenced according to this invention, by the use of said catalysts in such manner as to assume the final composition III mentioned in table 2 below. If the carbon dioxide is washed out or removed from this gas in some other manner up to for instance 4%, a gas is obtained which possesses approximately the composition IV described in the table 2 and which has a heating value of 4650 heat units and therefore resembles the usual illuminating gas.

Table 2

|  | III | IV |
| --- | --- | --- |
|  | Percent | Percent |
| $CO_2$ | 31.5 | 4.0 |
| CO | 19.4 | 27.1 |
| $H_2$ | 26.3 | 37.0 |
| $CH_4$ | 18.4 | 25.9 |
| $C_nH_m$ | 0.9 | 1.1 |
| $N_2$ | 3.5 | 4.9 |
|  | 100.0 | 100.0 |

The new process may be applied also with advantage to gasification with oxygen in the case where a coal with a high content of moisture shall be gasified. For the heat content of the relatively small quantity of gas formed in the gasifying zone of the gas producer does not suffice for the gasification and drying of the coal. If however, according to this invention, an additional quantity of flue gases is introduced into an upper zone of the gas producer, the thus enlarged quantity of gas allows to remove the high water content of the coal by a convenient temperature and thus to obtain the desired gas composition.

The term "gas producer of the air-blowing type" as employed in the claims is intended to refer to gas producers blowing with air, oxygen or gas containing air or oxygen or both air and oxygen.

Various changes may be made in the details disclosed in the foregoing specification without departing from the invention or sacrificing the advantages thereof.

We claim:

1. In the manufacture of industrial gases in a gas producer, the steps of gasifying in a gas producer of the air blowing type a fuel arranged therein in the form of a column, partly burning a fuel by means of an oxygen containing gas outside, but in close vicinity of said gas producer in such manner as to produce a gas mixture containing substantially no hydrogen, but a substantial percentage of unburnt CO and $CH_4$ and having a temperature not substantially exceeding about 1000° C. and being lower than the highest temperature of the gas producer, and introducing said gas mixture directly into a zone of the column of fuel in the producer situated above the highest temperature gasifying zone and having a temperature below 1000° C. whereby the final composition of the gas withdrawn from the upper part of the producer is rendered different from that of the ordinary producer gas.

2. The process of claim 1, wherein combustion of the fuel outside the gas producer is effected with oxygen gas.

3. The process of claim 1, wherein combustion of the fuel outside the gas producer is effected with air.

4. The process of claim 1, wherein the gas producer is blown with air and steam.

KARL KOLLER.
ZSIGMOND GÁLOCSY.